(12) United States Patent
Breiter et al.

(10) Patent No.: US 8,316,130 B2
(45) Date of Patent: Nov. 20, 2012

(54) SYSTEM, METHOD AND COMPUTER PROGRAM PRODUCT FOR PROVISIONING OF RESOURCES AND SERVICE ENVIRONMENTS

(75) Inventors: Gerd Breiter, Wildberg (DE); Jutta Kreyss, Stuttgart (DE); Andrea Schmidt, Boeblingen (DE); Tamar Eilam, New York, NY (US); Sandra D. Miller, Chapel Hill, NC (US); Lily B. Mummert, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 11/314,685

(22) Filed: Dec. 21, 2005

(65) Prior Publication Data

US 2006/0159014 A1    Jul. 20, 2006

(30) Foreign Application Priority Data

Dec. 22, 2004   (EP) ..................................... 04106885

(51) Int. Cl.
*G06F 15/16* (2006.01)
*G06F 15/173* (2006.01)
*G06F 9/46* (2006.01)
*H04L 12/26* (2006.01)

(52) U.S. Cl. ........ 709/226; 709/203; 370/229; 370/252; 718/104; 718/105

(58) Field of Classification Search ................. 709/203, 709/226; 718/104, 105; 370/252, 229
See application file for complete search history.

(56) References Cited

U.S. PATENT DOCUMENTS

| | | | | |
|---|---|---|---|---|
| 5,093,912 A * | 3/1992 | Dong et al. | .................... | 718/104 |
| 6,463,454 B1 * | 10/2002 | Lumelsky et al. | ............ | 718/105 |
| 2003/0028642 A1 * | 2/2003 | Agarwal et al. | ............... | 709/226 |
| 2003/0105868 A1 * | 6/2003 | Kimbrel et al. | ............... | 709/226 |
| 2004/0181794 A1 * | 9/2004 | Coleman et al. | ............. | 718/104 |
| 2006/0092851 A1 * | 5/2006 | Edlund et al. | ................. | 370/252 |

* cited by examiner

*Primary Examiner* — Peter Shaw
(74) *Attorney, Agent, or Firm* — Cantor Colburn LLP; William A. Kinnaman, Jr.

(57) ABSTRACT

The present invention provides a system, method, and computer program product to accelerate provisioning by dynamically creating dynamic free pools (DFPs) of pre-provisioned resources that are provisioned in advance, and are ready and free for use. A DFP construct for a resource, and its associated dynamic free pool manager are generated dynamically from a formal description of an aggregated resource structure (e.g. in the form of an XML schema). The present invention also provides a system, method, and computer program product to improve the delivery time of SEs based on the DFP constructs. The methods are extended to deal with special conditions such as contention over resources, or critical delivery time.

3 Claims, 11 Drawing Sheets

SYSTEM, METHOD AND COMPUTER PROGRAM PRODUCT FOR PROVISIONING OF RESOURCES AND SERVICE ENVIRONMENTS

CROSS-REFERENCE TO RELATED APPLICATIONS

This application claims the priority benefit, under 35 U.S.C. § 119, of European patent application 04106885.9, filed Dec. 22, 2004, and incorporated herein by reference.

BACKGROUND OF THE INVENTION

1. Field of the invention

The subject of present invention relates to provisioning of resources and service environments (SEs) required for IT service offerings, and in more particular to an accelerated provisioning of such resources and SEs.

2. Description of the Related Art

In the traditional outsourcing business the customers who want to concentrate on their core business hand over their IT business or at least parts of it to service providers who run the IT business for several customers. For each outsourced IT business of a specific customer the service provider has to provision a specific SE. The term provisioning of a specific SE as used in the present patent application means the creation of all resources needed for such an SE, how to manage those resources in order to fulfill the conditions specified for example in an agreement or the defined IT service offering, how to handle situations like resource shortages or resource over-provisioning, and the appropriate assigned resource management actions like configuring or installing of said resources. The provisioning is accomplished by using a "provisioning system" that provides function components necessary to accomplish such a provisioning. Each IT component within the specific SE represents a so-called resource.

Prior art provisioning systems create and manage multiple SEs on a shared infrastructure. The infrastructure consists of static free pools of hardware resources such as servers and storage, network resources such as virtual local area networks (VLANs), switches, and, firewalls, and software resources such as licenses. The SEs that the provisioning system creates and manages may pertain to a variety of domains including e-business services, life-science applications, and on-line gaming. The provisioning infrastructure ensures smooth operation of the SE instances by dynamically reconfiguring the infrastructure to adjust resource allocation to the SEs.

Provisioning system and the SEs they manage differ in the types of resources used, the topology of the network connecting them, the services that are offered, and the business and operational constraints that govern their operations.

The provisioning system operates on resources types or parts. Resource types may be basic resource types or aggregated resource types. An aggregated resource type is a logical resource that is defined as a federation of other related resources (represented by other parts). An example of an aggregate resource type, which is represented in a parts catalog, may be a WebSite which federates the following resources: loadBalancer, frontendVLAN, backendVLAN, WebServerGroup, database, firewall. The aggregate resource definition may also include a set of relationships needed to be satisfied, e.g. a use relationship between the WebServerGroup resource and the database resource.

The federated resources can be also aggregated resources and/or basic resources. The expansion of an aggregated resource to its federated resources is a recursive process and results in a tree structure termed topology tree whose nodes are the resource types, the descendants of every node are the resources it federates and the leaves of the tree are basic resources for which RMs exist.

The structure/definition of an SE can also be represented as an aggregated resource.

A typical prior art provisioning system 10 is shown in FIG. 1. The provisioning system normally consists of resource managers (RMs) 60, resource services (RSs), a parts catalog (PC) 40, a planner component (PL) 20, and a runtime engine (RE) 30.

The resource managers (RMs) encapsulate logic to provision and manage a particular type of basic resource. Resources can be physical (e.g., an xSeries server) or virtual (e.g., a logical partition (LPAR) on a zSeries server). A resource may be allocated to a service environment or unallocated (free). Free basic resources (that are not virtual) are kept in a logical structure called a free pool 50. An important function of the RM is managing the free pool, including tracking availability of resources and selecting resources for allocation to a service environment. In some cases the RMs actually create the resource. For example, an LPAR RM may create an LPAR by configuring a zSeries machine.

Resource services (RSs) encapsulate configuration operations that need to be performed on a single resource or a set of resources. Such configuration operations may include switch configuration, installation of software, etc.

The parts catalog includes descriptions of resources and capabilities in the form of XML definitions termed parts. Parts can represent basic resources for which an RM exists or aggregated resources previously defined. Parts may reference other parts, for example, a part for an aggregated resource references the parts for its federated resources. SEs are also represented as aggregated resources for which parts exist in the catalog.

A planner component is used to generate, given an SE definition, a set of automation procedures and instructions, termed plans, that include invocations of operations on RMs and RSs, and that are used in order to provision and manage the SE.

Specifically the structure of the SE is defined as an aggregated resource; from it, the following plans are created: (1) plans to provision and de-provision (destroy) the SE; and (2) plans to change the capacity of an SE by changing the number of instances of each of the federated resources designated as "variable" the definition of the SE.

A runtime engine (RE) is used to execute plans generated by the planner upon an explicit user request (e.g., a subscription to an SE triggers its provisioning), or upon an internal system event (e.g., a high load event can trigger adding Web servers to a Web site SE).

The process of creation of an SE, or changing its capacity, may take a significant time for the following reasons:

1. Limited or no control over the time it takes to perform manual operations.
2. Limited or no control over the time it takes to obtain resources/services from a third-party provider. In particular, resources may not be available at the time of the request (an example is obtaining a VPN connection from a third party network provider which takes approximately two days).
3. The process of provisioning aggregated resources from a set of basic resources is time consuming. In particular, operations such as installation of software and operating systems, and data management operations are time consuming and may take several hours to complete.

4. In case of resource contention, resources may need to be de-allocated from other running SEs; the process involves deconstruction of aggregated resources and returning the basic resources to their respective free pools before they can be used for the new SE. Typical operations may include disk scrubbing to satisfy a security policy.

SUMMARY OF THE INVENTION

Starting from this, it is object of the present invention to provide a system, method and computer program product avoiding the disadvantages of the prior art provisioning systems as described above.

The present invention provides a system, method, and computer program product to accelerate provisioning by dynamically creating dynamic free pools (DFP) of pre-provisioned resources that are provisioned in advance and are ready and free for use. A DFP construct for a resource and its associated dynamic free pool manager are generated dynamically from a formal description of an aggregated resource structure (e.g. in the form of an XML schema). The present invention also provides a system, method, and computer program product to improve the delivery time of SEs based on the DFP constructs. The methods are extended to deal with special conditions such as contention over resources, or critical delivery time.

The present invention uses in a preferred embodiment a global dynamic free pool manager (GDFPM). The GDFPM uses decision algorithms allowing one to provision a resource with and without a DFPM, de-provision with or without deconstruction of the resource, and to transfer resources between SEs. The decision algorithms depend on objective functions, for example, total revenue of provisioning provider or amortized time for resources to be provisioned.

The decision algorithms may take into account parameters like revenue for allocation of a resource, penalty if not allocated in time, cost for having a resource provisioned, time to provision. The GDFPM reacts to state change events like creation and deletion of an SE, change of capacities of SE, change total number of resources in the system, addition of resource types and SE definitions into the parts catalog. The GDFPM decides on required combination of DFPMs and their assigned DFPs. Furthermore, it manages the set of DFPMs including their creation and their deletion.

The present invention uses in a preferred embodiment dynamic free pool managers (DFPMs). The creation and deletion of a DFPM is based on the decision of the GDFPM by using state change events and decision algorithms (policy). The DFPM manages an assigned DFP of aggregated resources. In a preferred embodiment the DFPM manages also basic resources and third-party owned resources. The DFPM may operate passive or autonomic based on its policy. In a preferred embodiment, the policy is input to constructor of the DFPM. In a preferred embodiment of the present invention, the DFPM extends the interfaces of a resource manager by Create, Delete, ChangeFPCapacity as well as Construct_DFPM and Destruct_DFPM.

The present invention uses in a preferred embodiment dynamic free pools (DFPs). A DFP may be generated in the following cases:
1. An aggregated resource does not have an RM. If the time to provision is significant, which may be the case if it requires time-consuming configuration, then a dynamic free pool may be generated.
2. Today, resources owned by a third party are obtained by contacting the third party when they are needed for an SE. A DFP of such resources can be created if the time to obtain the resource is significant. The cost of holding third-party owned resources needed to be taken into account in the decision.
3. Basic resources are resources for which an RM exists. These resources are not further partitioned to federated resources by the provisioning system. (Basic resources in one provisioning system can actually be complex and treated as an aggregated resource in other provisioning systems—for example one may think of a BioGrid RM.) In the case where the RM actually have to build the resource upon a create request it may make sense to provision a number of them in advance.

DFPM and their associated DFPs can be constructed and destroyed by the GDFPM dynamically (at runtime). The decision is based on the parts catalog state, and the state of the provisioning system (SE instances and their state, the state of the DFPs).

BRIEF DESCRIPTION OF THE SEVERAL VIEWS OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

DESCRIPTION OF THE PREFERRED EMBODIMENTS

Figure 2:
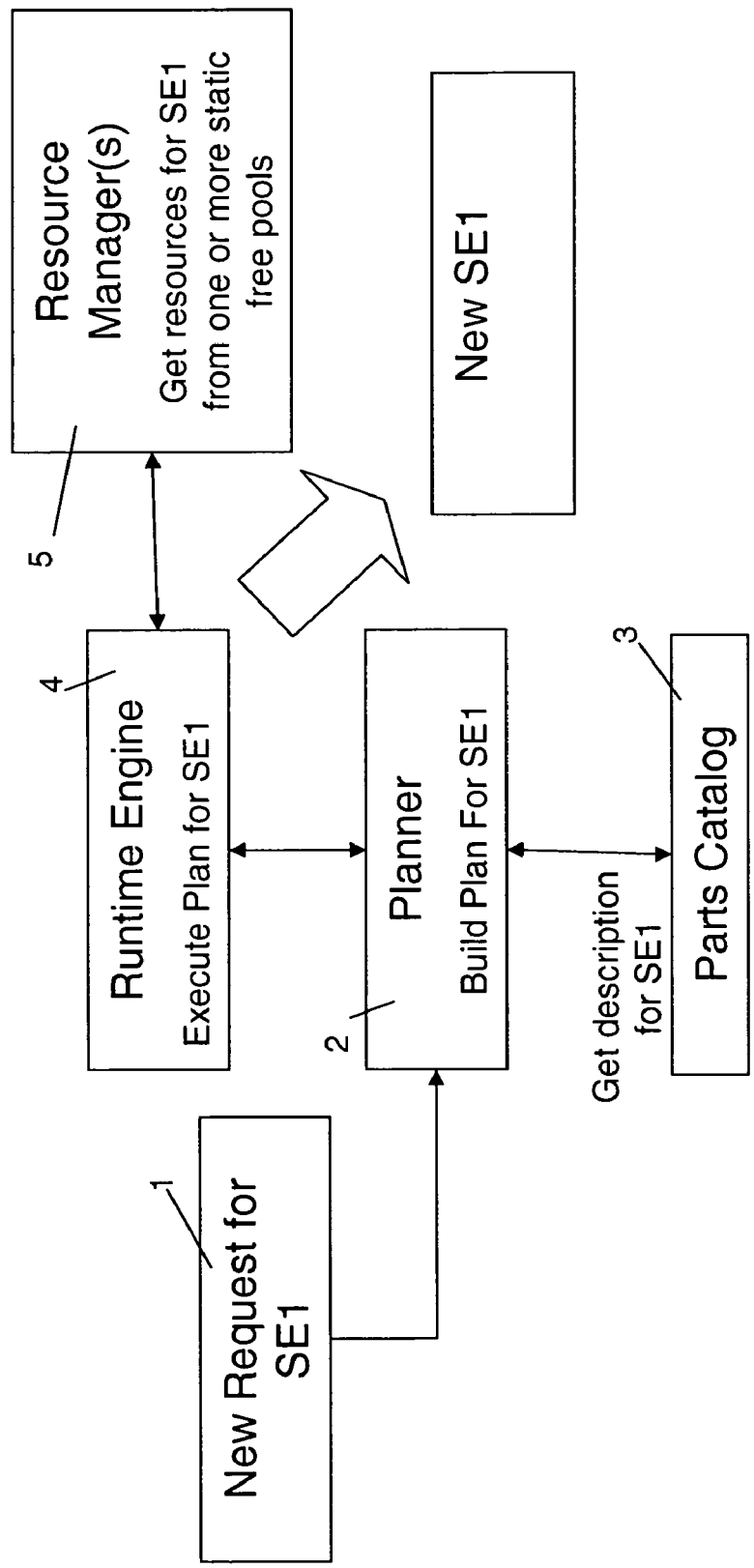
FIG. 2 shows the method steps for provisioning an SE using a prior provisioning system.

FIG. 2 shows provisioning of an SE according to the prior art. A new request 1 for an SE due either to a customer subscription or to increasing workload on the provisioning system is generated. The new request 1 is propagated to the planner component 2 which handles the new request 1. The planner component retrieves the description for the SE from the parts catalog 3, builds the plan, and sends it to the runtime engine for execution 4. The runtime engine executes the plan for the requested SE. It interacts with the required RMs 5 for the resources that are required to build the SE. Each RM has its own static free pool from which it can take resources 5.

Figure 4:
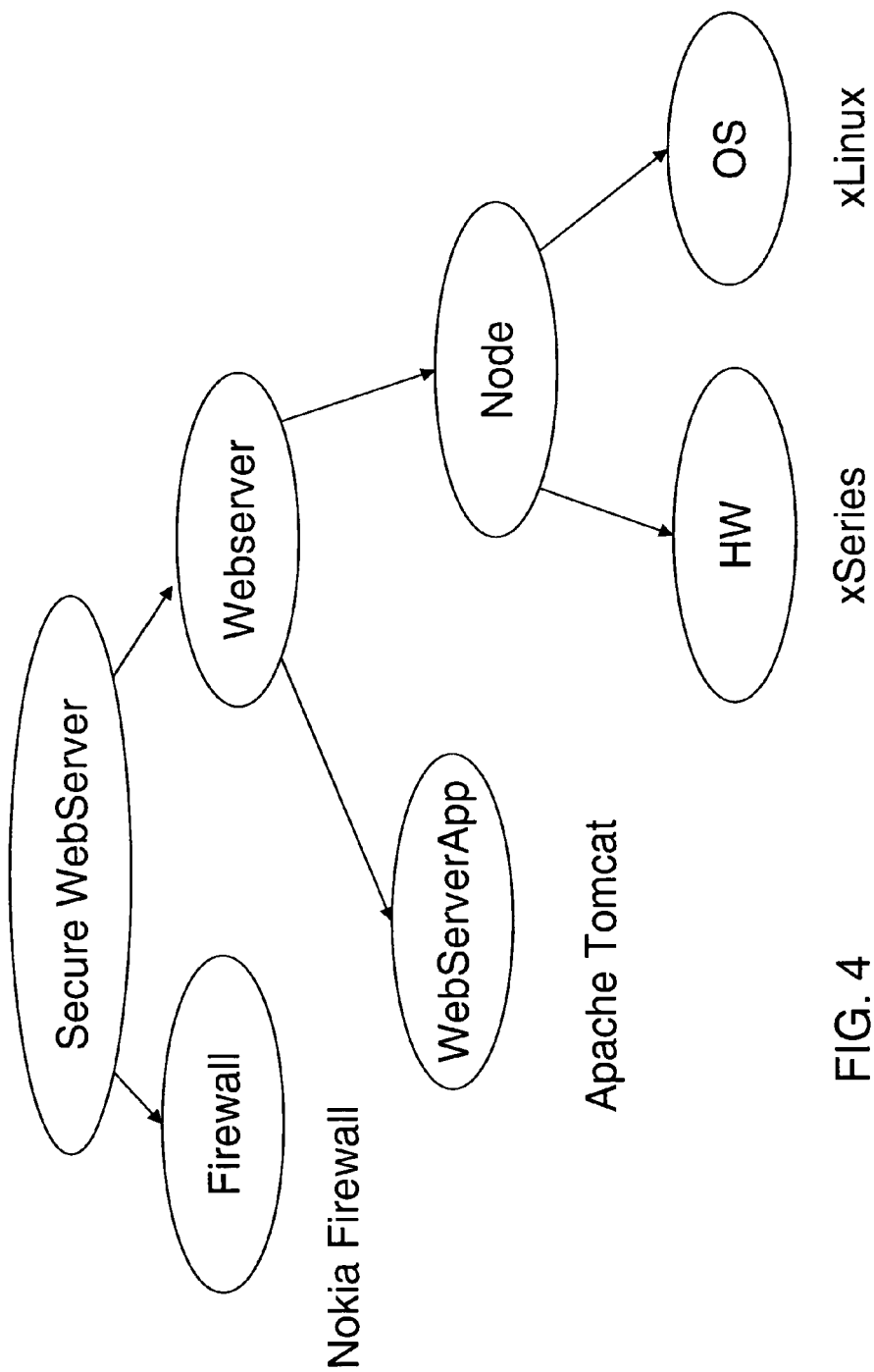
FIG. 4 shows an example of an SE with variable federated resources.

FIG. 4 shows an example of an SE, namely, a Secure WebServer SE which will be built up. The parts catalog contains the description of that SE; namely, it describes all resources which belong to the Secure WebServer SE. The Secure WebServer SE comprises a firewall (Firewall), a Web server application (WebServerApp), an operating system (OS), and hardware (HW). Each resource is assigned an RM which will be then invoked. The sequence in which they are invoked is defined in the description of the SE. The build plan defines the workflow, scripts and configuration actions to be taken to create the new SE.

Figure 3:
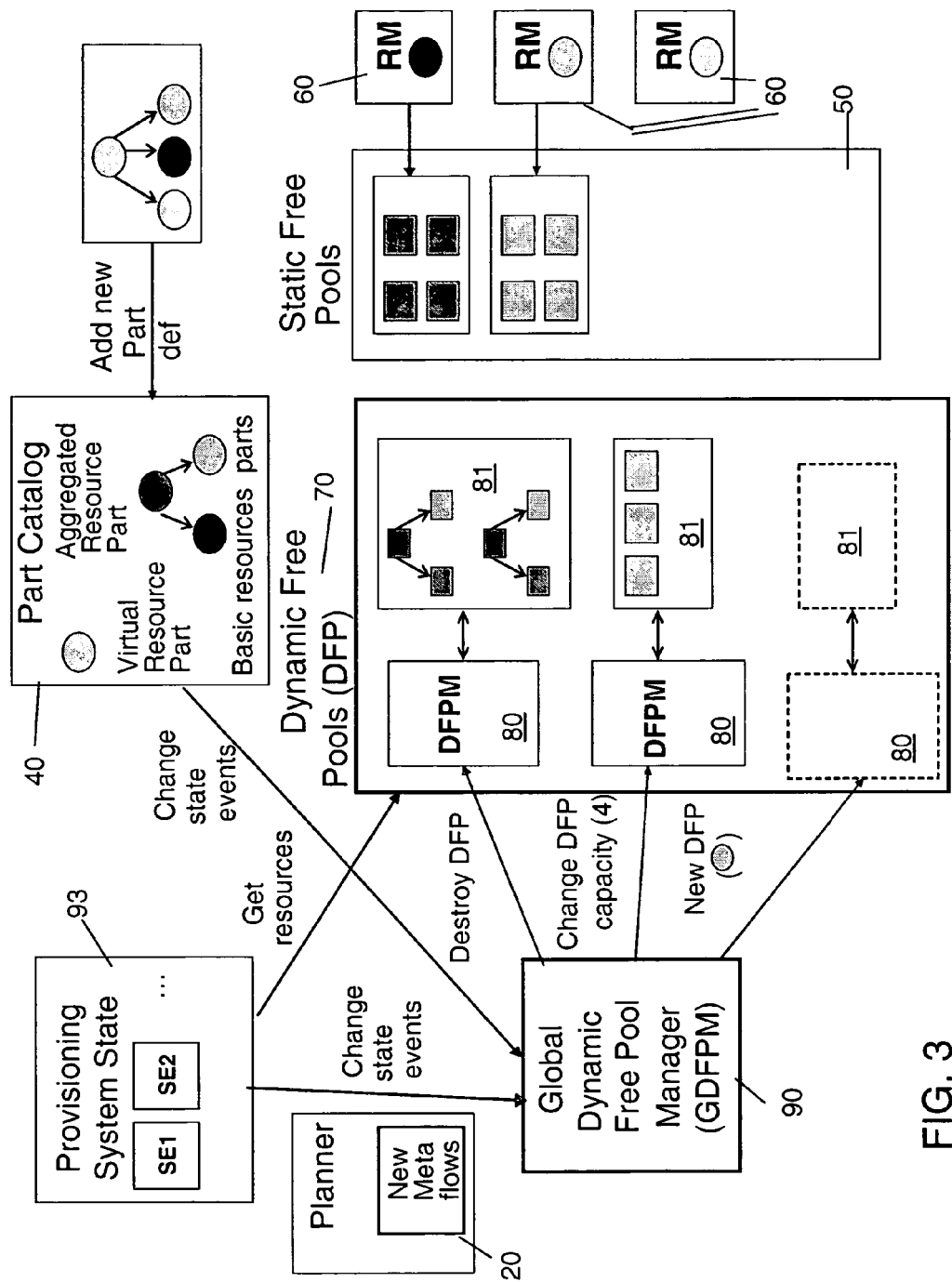
FIG. 3 shows a prior art provisioning system extended by the present invention.

FIG. 3 shows a prior art provisioning system with the inventive extension. The inventive extension comprises the dynamic free pools (DFPs) 81, their respective DFP managers (DFPMs) 80, and a global DFPM (GDFPM) 90 which controls the overall operations by interacting with the individual DFPMs 80.

DFPMs 80 and their associated DFPs 81 can be constructed and destroyed by the GDFPM 90 dynamically at runtime. The decision is based on the state of the parts catalog 40, and the state of the provisioning system 93 (SE instances and their state, state of the DFPs) and the policy the GDFPM operates on.

Now the functionality of the DFPM Interfaces is described.

A DFPM 80 is used to manage each one of the dynamically generated DFPs 81. It extends the standard interfaces of a resource manager (RM) 60. Specifically, it provides the following interfaces:

Create returns a handle of a resource instance in the DFP 81. The operation fails if the DFP 81 is empty. This is similar to the RM interface with the same name.

Delete gets a handle to a resource instance that was in use and returns it to the DFP 81 (in some cases, described later, aggregated resources will be deconstructed to their basic resources and not returned to their DFP). This is similar to the RM interface with the same name.

ChangeFPCapacity gets a new capacity number n. For a positive number n it provisions and adds n instances to the DFP 81. Otherwise it deconstructed −n instances (returning the basic resources to their static free pool).

In addition it provides the following static (class based) constructor method:

Construct_DFPM gets a resource type description (a reference to a part) and an initial capacity and optionally a description of the required behavior (in the form of policy). Construct a DFPM instance 80 and a DFP 81 with the initial capacity.

In addition it provides the following static (class based) destruction method:

Destruct_DFPM destructs the DFPM instance 80 and the associated DFP 81. Deconstructs all the resources and return the basic resources to their static free pools 50.

Now the dynamic generation of the DFPM and DFP is described.

The description below focuses on the case of an aggregate resource type, which is the most difficult case.

Figure 10:
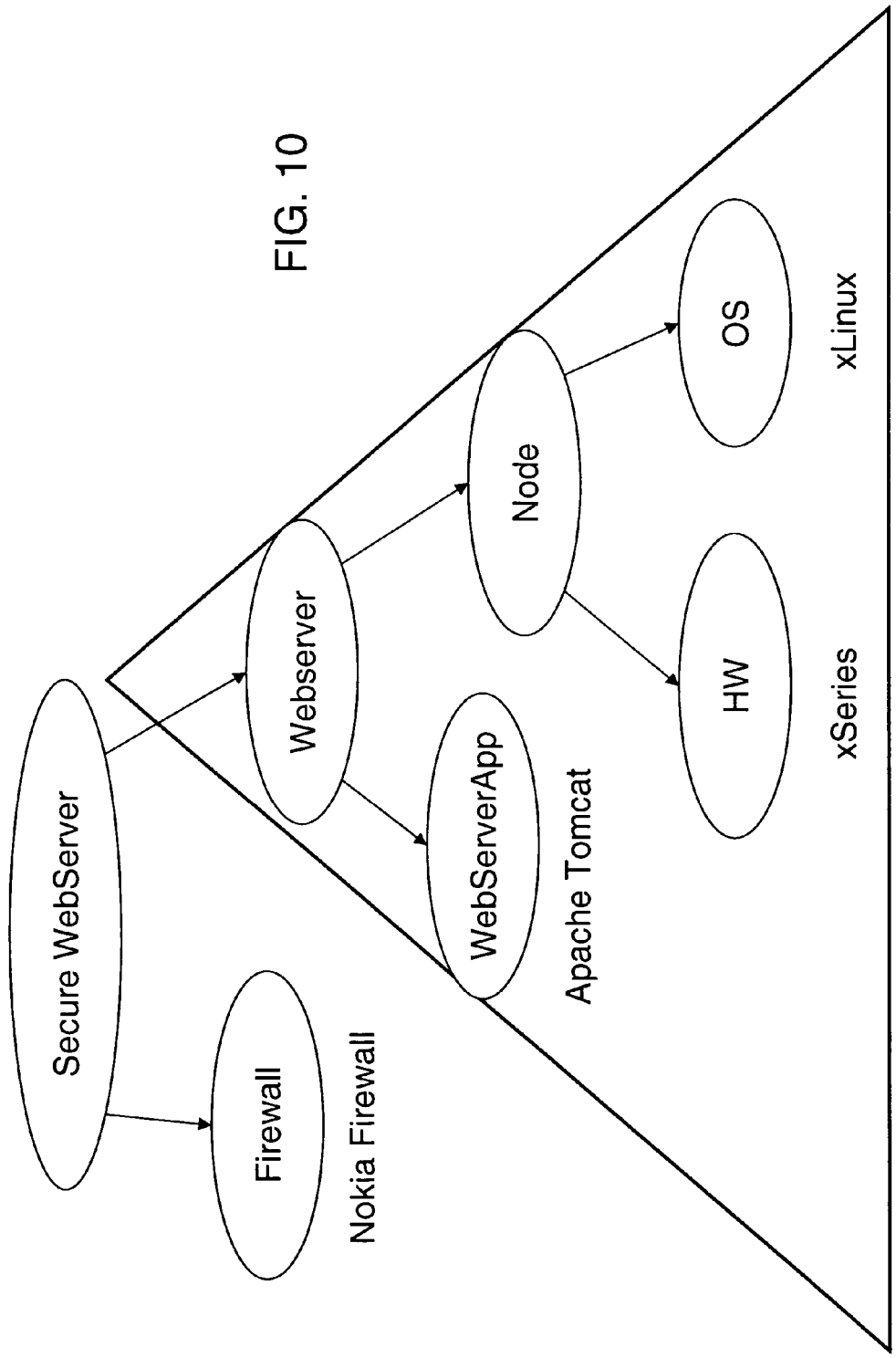
FIG. 10 shows an example of a dynamic free pool (DFP).

The role of the DFPM 80 is to manage a DFP 81 of aggregated resources (an example of a DFP is shown in FIG. 10). Management involves adding instances of aggregated resources to the DFP 81 upon request or automatically. The process of adding an aggregated resource instance involves creating it by recursively creating its federated resources and configuring them together. The logic to create different aggregated resource types depends on the resource type definition. The conditions under which it can generate dynamically (at runtime) DFPs 81 are described below.

The workflow to create an aggregated resource from basic resources can be generated dynamically by the planner component 20 from the definition of the aggregated resource provided by the parts catalog 40. For every SE (represented as an aggregated resource) the planner component 20 generates the following plans: (1) plans to create and destroy the SE; and (2) plans to create/add, and remove/destroy every "variable" federated resource to/from the SE (if defined as "variable").

The planner component 20 can be used based on the same idea to generate for every DFP 81 for an aggregated resource the following plans: (1) a plan to create an aggregated resource (and add to DFP), termed create_<resource_type_name>; and (2) a plan to destruct an aggregated resource and return the basic resources to their respective DFP, termed destroy_<resource_type_name>.

When a DFPM 80 is created by invoking its constructor Construct_DFPM, the implementation of the constructors calls the planner component 20 to generate the aforementioned plans. A reference to the constructed plans is returned and kept in the new DFPM instance 80.

Whenever a new instance of an aggregated resource has to be created and added to the DFP 81 (this can be either through the ChangeFPCapacity call or when initially constructing the DFP 81), the create_< . . . > plan is executed the number of times required. If an instance has to be destroyed the destroy_<. . . > plan is executed.

Now the operation of the DFPM 80 is described.

DFPMs 80 can operate in either a passive or an autonomic way.

A passive DFPM 80 serves requests to change capacity by invoking the plans as described above. It also serves create and delete requests by providing a handle to an existing instance in the DFP 81 in the first case, and returning a handle of a resource instance to the DFP 81 in the second case.

An autonomic DFPM 80 can decide based on a policy to change the capacity of the DFP without an explicit ChangeFPCapacity request. An example of a policy that can be used is a function that determines the required capacity of the DFP based on total number of basic resources (that are federated by this resource an aggregated), resource usage pattern, time to provision, and other parameters.

Since the aforementioned behaviors are not related to a specific resource type they can be implemented separately and used in the dynamically generated DFPMs 80. The policy given as a parameter to the DFPM constructor method will determine which of the behaviors will be activated.

Finally the operation of the GDFPM 90 is described.

The role of the GDFPM 90 is to manage the set of DFPMs 80. It receives change-of-state events including creation and destructions of SEs, change capacities of SEs, change in the total number of resource instances in the system, and also addition of resource type and SE definitions to the parts catalog 40.

Based on the events and the policy it operates on, it decides on dynamic creation of new DFPMs 80, deletion of DFPMs 80, or a change in their capacity. It uses the DFPM 80 interfaces in order to perform the operations to fulfill the decision.

The GDFPM 90 can use known heuristics or optimization algorithms to decide on the required combination of DFPMs 80 and their capacity. It uses the mechanisms described in this invention to carry out the decisions.

The actual decision algorithm used depends on the objective function. Examples are the total revenue of the provisioning system owner or the amortized time for resources to be provisioned. The GDPFM 90 may also work with a more general arbiter component of the provisioning system.

The decision algorithm used may take into account the following parameters for every resource: (1) revenue for allocation of the resource; (2) penalty if not allocated in time; (3)

cost for having the resource in a running state (in the DFP or an SE); (4) time to provision; and (5) usage patterns (how many, for what duration).

Figure 1:
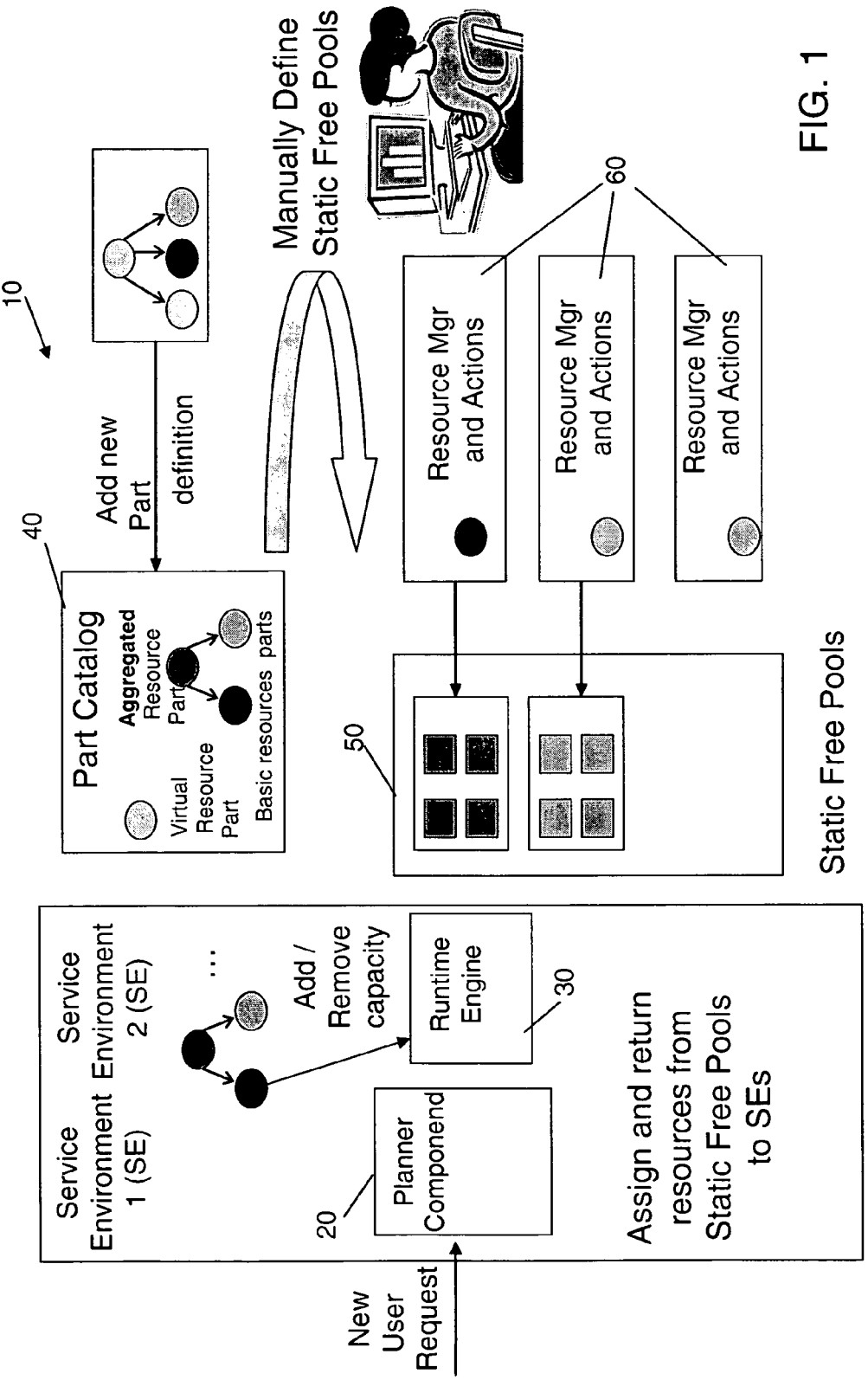
FIG. 1 shows a prior art provisioning system.

In a preferred embodiment of the present invention, the inventive provisioning idea may also be used for basic resources. This case is much simpler; the create interface of the RM 60 is used to provision the resource, which is then kept in the DFP construct (as shown in FIG. 1).

In another preferred embodiment of the present invention, the inventive provisioning idea may also be used for third party owned resources/services. This case is similar to the previous one as a local RM represents such resources/services.

Figure 5:
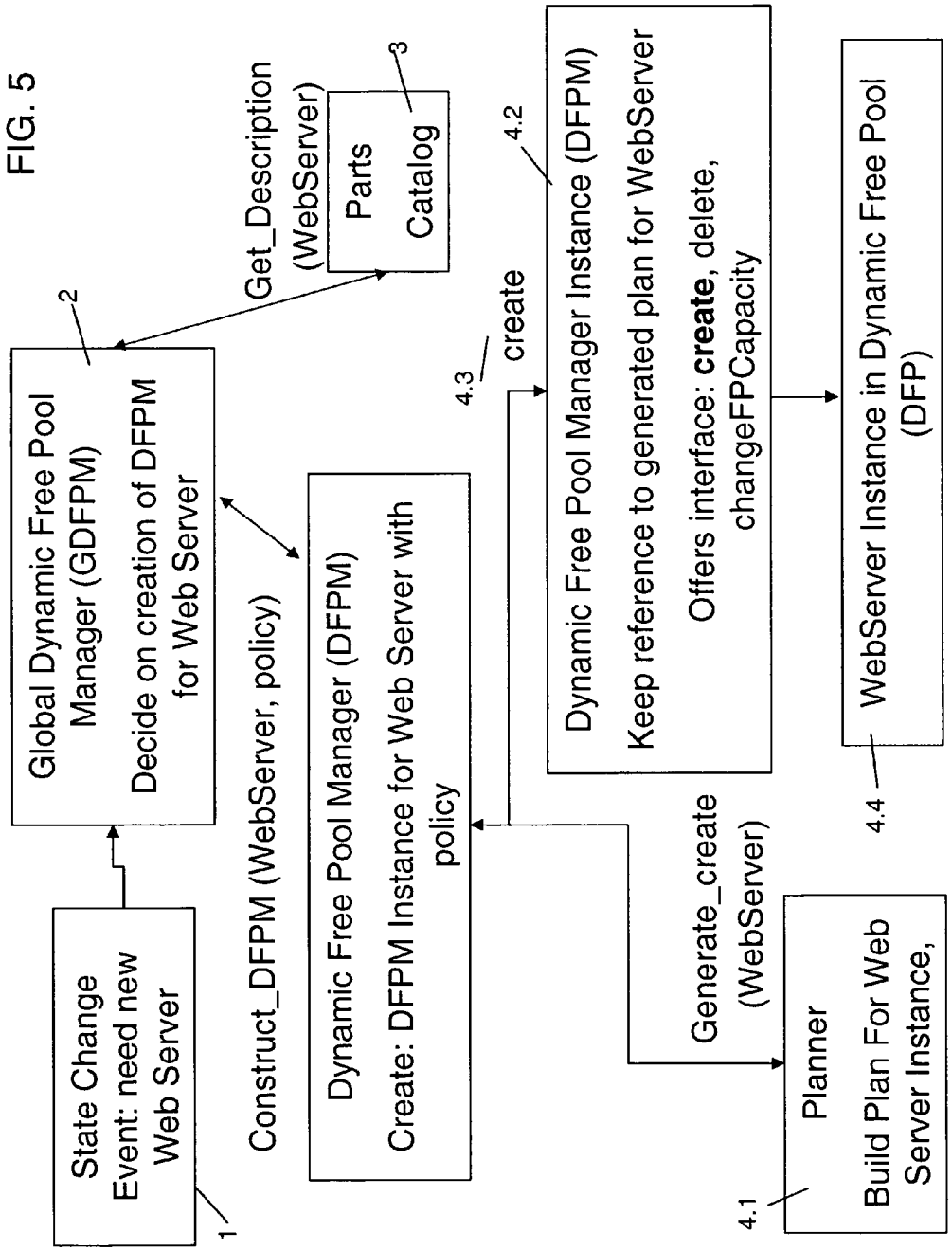
FIG. 5 shows the method for creation of a DFPM according to the present invention.

FIG. 5 shows method steps performed by the inventive GDPFM for creation of a DFPM.

A possible operation of the GDFPM is the creation of a DFPM. This may be done as a reaction to a "state change event" propagated by the provisioning system indicating, for example, that a new instance of a WebServer SE is needed (1).

The GDFPM may operate, for example, on a policy that forces the creation of a new DFPM whenever a certain number of requests for a certain SE have been received.

The GDFPM interacts with the parts catalog to retrieve a description of the SE (3).

The GDFPM creates a DFPM by invoking the Construct_DFPM method of the DFPM class. The type WebServer SE is passed to this method. In addition, a policy may be specified to enable the DFPM to act autonomously. An example for such a policy would be: If the number of instances in the dynamic free pool is less than 5, then create another 2 instances or every instance returned is to be decomposed (2).

The implementation of Construct_DFPM invokes the planner component (4.1) to create the plans needed to create a WebServer SE and also creates an instance of a WebServer SE-DFPM together with its DFP (4.2). A reference to the plan is kept in the DFPM instance (4.2).

After creating the DFPM instance, an instance of a WebServer SE can be created by invoking the DFPM Create method (4.3).

Figure 6:
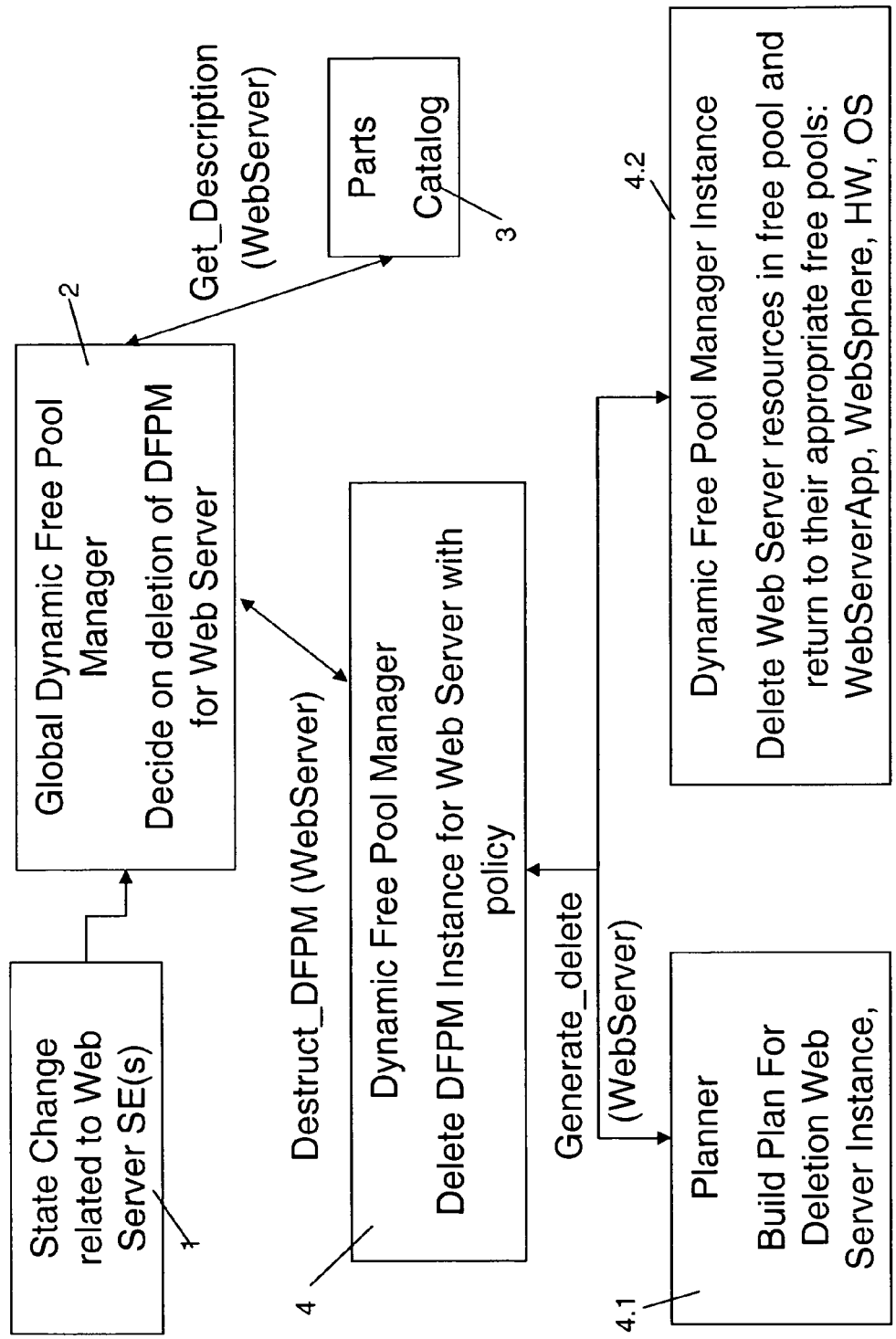
FIG. 6 shows the method for deletion of a DFPM according to the present invention.

FIG. 6 shows the method steps performed by the GDPFM for deletion of a DFPM according to the present invention.

The GDFPM receives a state change event from the provisioning system (1). This event may indicate that the last instance of the WebServer SE is to be destroyed. Operating on a policy defining "if the last SE is to be destroyed, destroy all its DFPMs", the GDFPM decides to destroy the DFPM (4). This is done by invoking the Destruct_DFPM method. The DFPM might be itself policy driven (2): if the DFPM is destroyed, destroy all instances of the DFP and return them to their DFPs (4.2). The planner is invoked to build the destroy plan (4.1).

Figure 7:
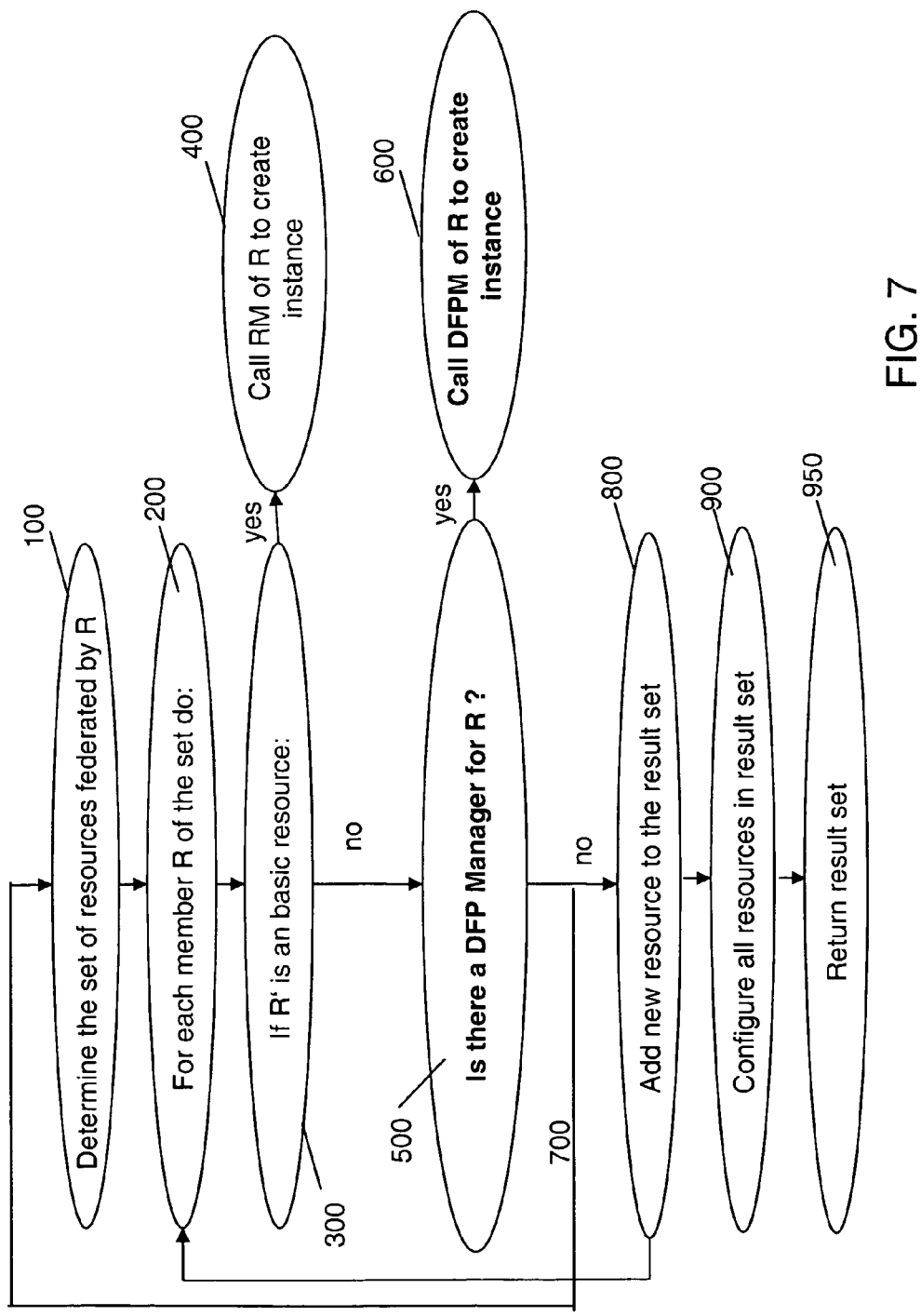
FIG. 7 shows the method how to construct a plan for creation of an SE or a federated resource.

FIG. 7 shows the method of how to construct a plan for creation of an SE or a federated resource.

A request for generating a new SE or instantiating a federated resource for an already existing SE is received by the provisioning system, e.g. a state change event issued by an event handling component (not shown).

The event handling component propagates this event to the GDFPM. Then, the GDFPM calls the planner component, which generates a plan for the new SE and for adding a federated resource to an existing SE. The description for the SE is contained in the parts catalog. FIG. 4 shows an example of such a description of an SE which contains the variable federated resource Secure WebServer. The WebServer itself may contain the variable federated resource Node. The DFPMs are generated by the GDFPM based on the GDFPM policy, e.g. generating DFPMs for every variable federated resource designed in the SE description or in the case that an SE is currently not used to keep the DFPMs as well as their associated variable federated resources for later usage in a new SE.

The DFPMs are generated by the GDFPM by invoking Construct_DFPM. The implementation of Construct_DFPM invokes the planner component to create the plans needed to create, for example, a Secure WebServer SE (see FIG. 4) and also creates an instance of a WebServer DFPM together with its DFP. A reference to the plan is kept in the DFPM instance.

The method of construction of plans to create a new SE or to add a federated resource to an existing SE is based on the sample flow depicted in FIG. 7.

For every SE or federated resource (represented as an aggregated resource) the planner component generates the following plans: (1) plans to create and destroy the SE or federated resource; and (2) plans to create/add, and remove/destroy every "variable" federated resource to/from the SE (if defined as a "variable" resource).

At first the construction of a plan for creation of an SE or federated resource is described with respect to FIG. 7.

1. A new SE (called R) or federated resource (called R) to an existing SE is required.
2. Determine the set S of resources federated by resource R (100).
3. For each member of S apply the following procedure, set forth in subparagraphs 4 through 6 below (200):
4. If the member of S is a basic resource (300), then invoke the RM of the member of S to create an instance of the basic resource (400); if the member is no basic resource, then check for the existence of a DFPM for the member of S (500). If one exists call it to create the instance (600).
5. If no DFPM exists (700) then continue with the step set forth in subparagraph 2 above until only basic resources are available.
6. Add newly provisioned resources (federated variable or basic resources) to the result set (800).
7. Configure each member of the result set (900).
8. Return result set to the caller (950), e.g. GDFPM or DFPM.

After creation of the DFPM instance, an instance of a Secure WebServer SE can be created by invoking the DFPM create method. This method operates on a plan constructed in way as described above.

Figure 8:
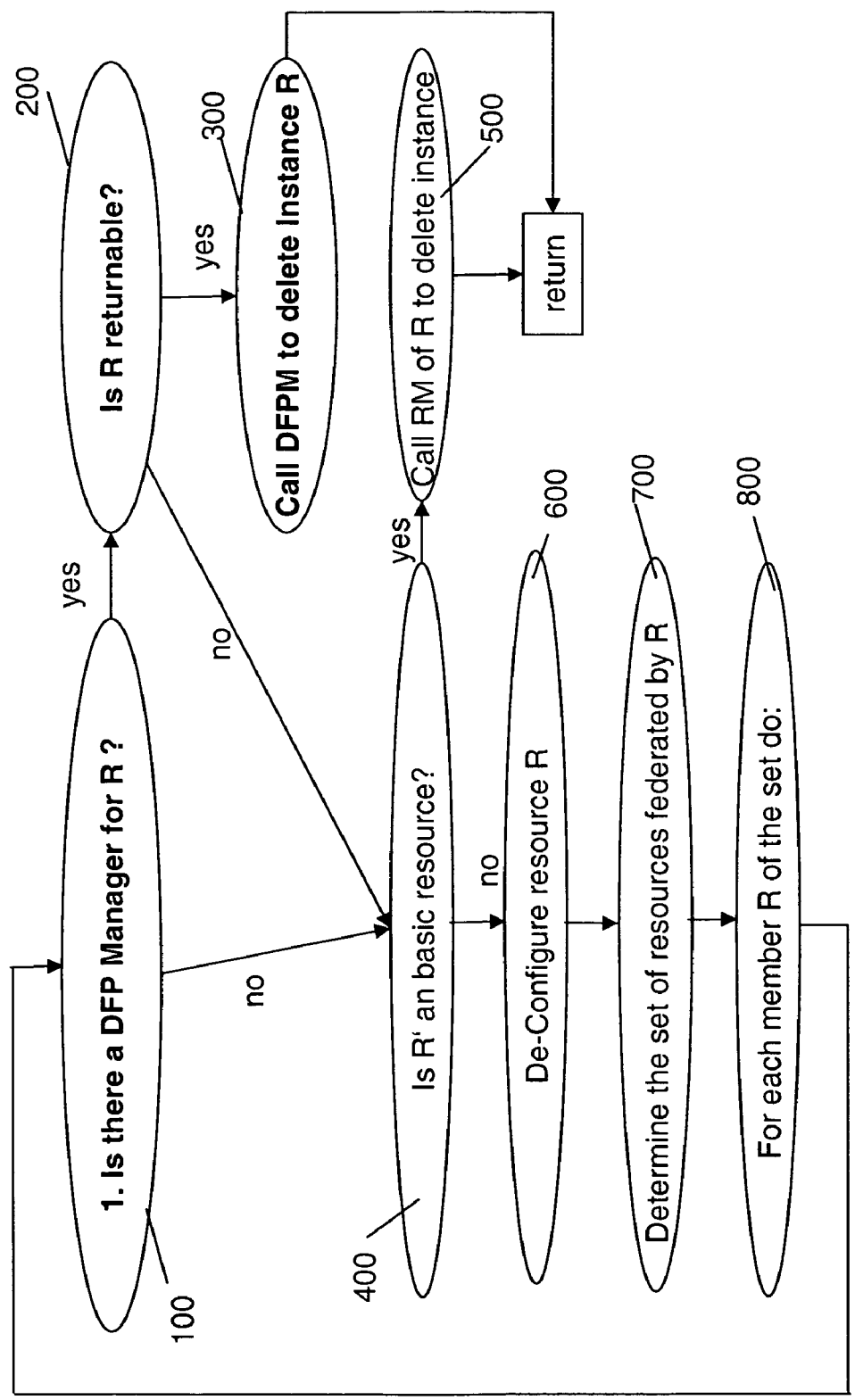
FIG. 8 shows the method how to construct a plan for deletion of an SE or a federated resource.

Furthermore, a further plan for destruction of a new SE or federated resource R, e.g. WebServer SE is generated. A destruction of a resource R will apply for example when the SE or federated resource R is no longer in use. The plan is generated by the planner component according to the following procedure as shown in FIG. 8:

1. Is there a DFPM for resource R (100)?
2. If yes, is resource R returnable (200)?
3. If yes, call DFPM to delete resource R from existing usage environment (300) and return it to the DFP (300).
4. If not returnable, is R a basic resource (400).
5. If R is a basic resource call RM to delete instance (500).
6. If R is not a basic resource de-configure R (600).
7. If R is not a basic resource determine the set S of resources federated by R (700).
8. Continue for each member of set S with step 1 (800).

Figure 9A:
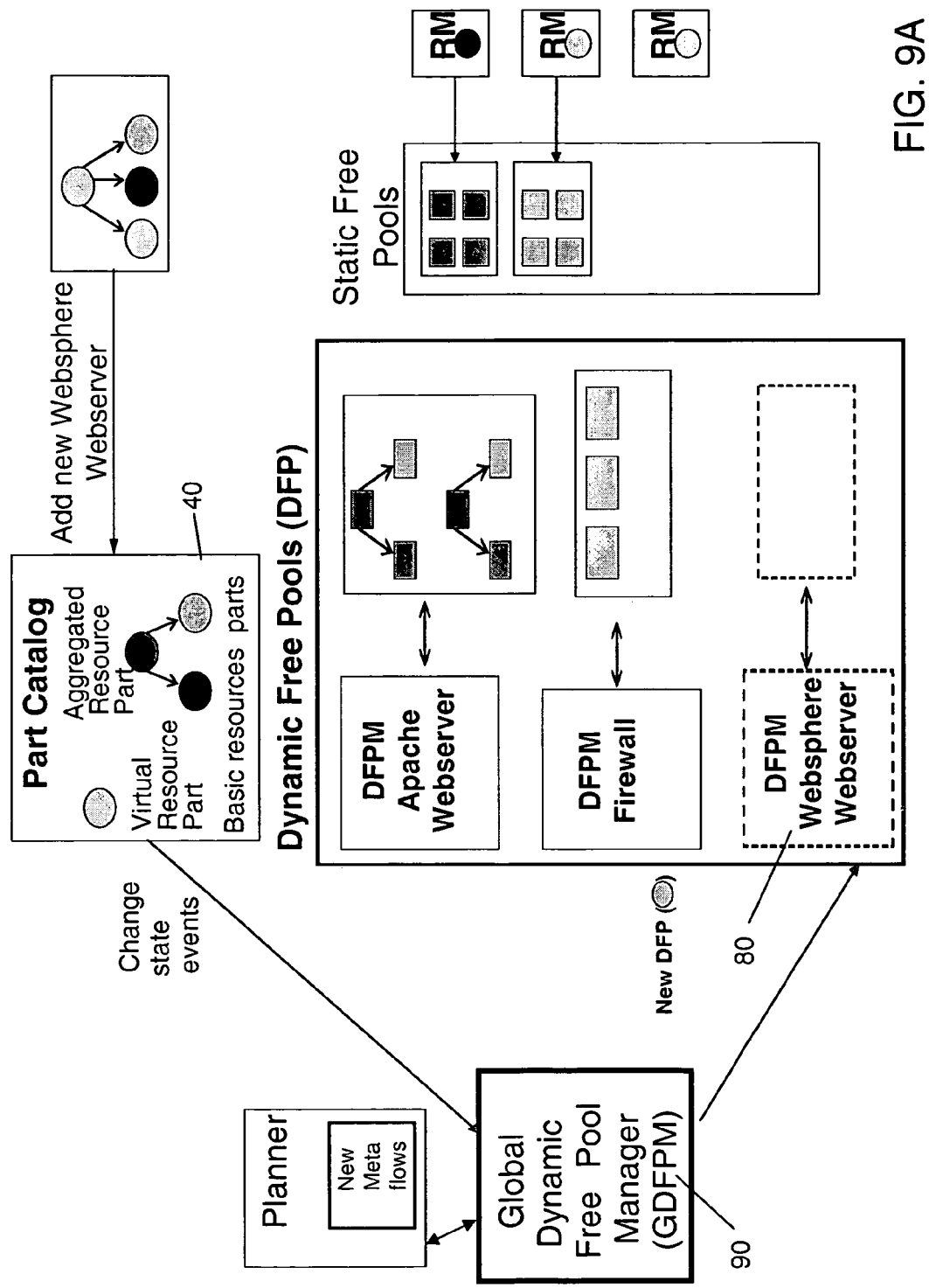
FIGS. 9A-9B show the operation of a GDFPM if a new type of SE is provided into the parts catalog.
Figure 9B:
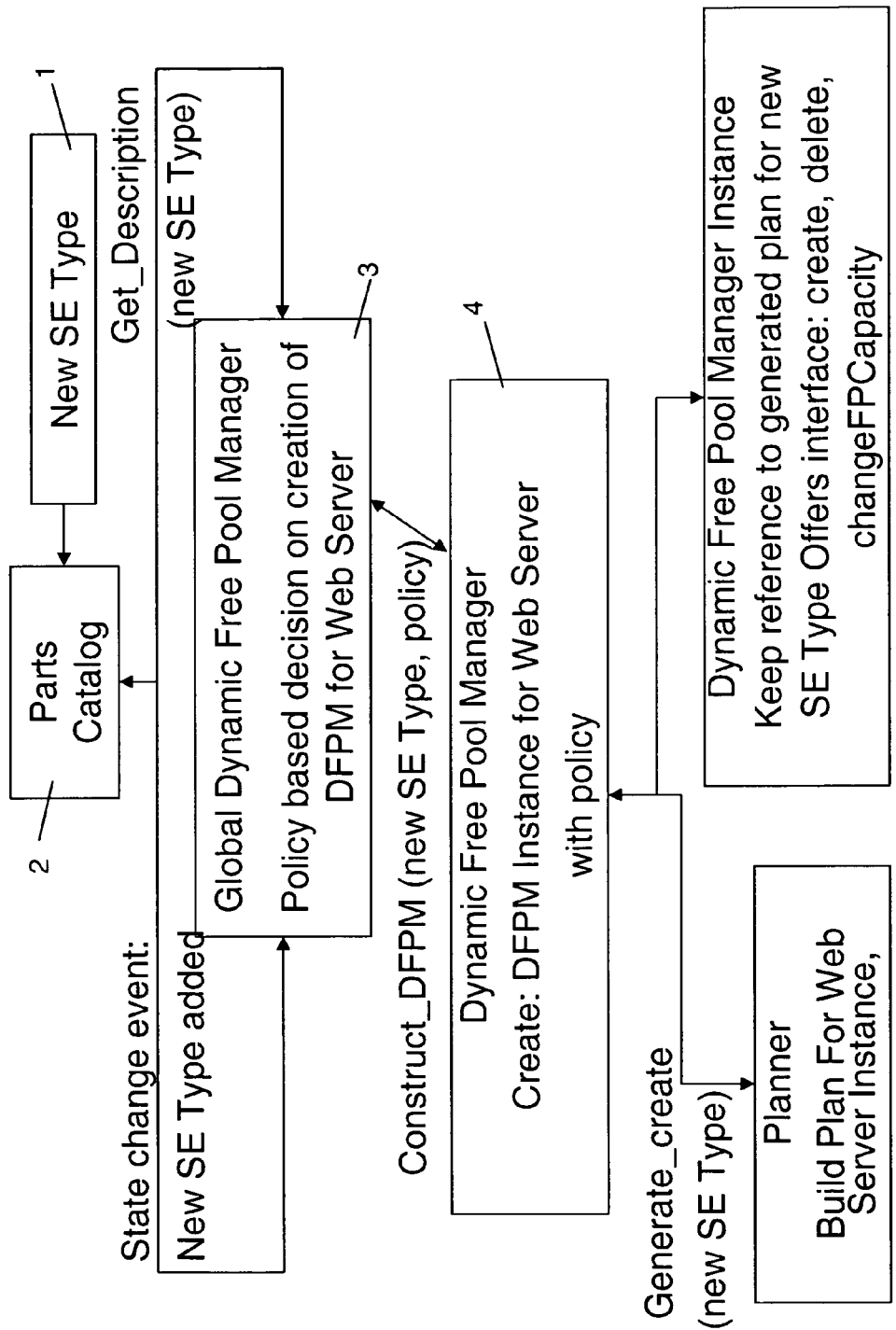

FIGS. 9A-9B show the inventive provisioning of a new SE type.

A new SE type, e.g. Websphere WebServer, is added to the Parts catalog 40 (1, 2). This addition in the Parts catalog creates an event that is propagated to the GDFPM 90 (3). The GDFPM 90 retrieves the description for the new SE type from the Parts catalog 40. Based on its policy the GDFPM decides to create a DFPM 80 for the new SE type (4). All further steps are identical to FIG. 7 with the exception that no SE instance will be created.

Now, a preferred implementation of the present invention is described. The preferred implementation describes a new method to provision resources and SEs, de-provision resources and SEs, and transfer of resources between SEs according to the present invention.

As described above the planner component generates a plan that is executed in order to provision a resource to an SE.

Now the prior art plan construction for provisioning a resource or SE is described as a meta-flow:

```
Provision(R)
For every R' in Federated(R)          // FEDERATED returns the
                                      list of federated
                                      // resources (the next
                                      level in the top. tree)
    If (Basic(R'))                    // if the federated
                                      resource is basic get
            Next_inst = RM(R').create( )   // it from its RM,
    else    Next_inst = Provision(R')  // otherwise provision it
                                      // by calling the same
                                      method recursively
    FederatedList.add(Next_inst)      // add to the list of
                                      federated resources
FederatedList.configure(R)            // configure all the
                                      resources in the list based
                                      on the definition of R
    Return FederatedList
```

The planner component based on the actual definition of the aggregate resource completes the meta-flow to a provisioning plan. For example—the configure operation depends on the definition of R; its actual implementation is generated by the planner component.

To leverage the DFPs constructions as taught by the present invention the provisioning meta-flow is changed such that a non-basic resource is created only if a DFPM for it does not exist; otherwise it is obtained instantaneously from the DFPM. The new meta-flow can be described as follows (bold signifies the changes made):

```
Provision(R)
For every R' in Federated(R)
    If Basic(R')
            Next_inst = RM(R').create( )
    else    DFPM = DFPM(R')           // DFPM( ) returns a
                                      DFPM object if it
                                      exists for R'
            If (DFPM<>Null)
                    Next_inst =       // R' is obtained
                    DFPM.create( )    from the DFPM
            else    Next_inst =       // recursive call
                    Provision(R')
    FederatedList.add(Next_inst)
    FederatedList.configure(R)
        Return FederatedList
```

New Method to De-provision Resources and SEs

When resources are de-allocated from an SE, they are deconstructed recursively and the basic resources are returned to their respective free pools.

When using the DFP constructions sometimes there is no need to deconstruct the resources down to the basic resources or deconstruct them at all.

In principle, if a federated resource has a DFP, it does not need to be deconstructed. Rather it is returned to the DFP using the delete interface of the DFPM. When doing that, some deconstruction processes may include cleaning customer sensitive data, e.g., by disk scrubbing.

If the aggregated resource is going to be used later by a customer who has strict security requirements (with respect to the customer that returned the resource) then the resource has to be deconstructed in order to be cleaned.

To take advantage of the DFP constructions it is incorporated and used a security policy, which defines the pairwise security requirements for every two SEs. (Security policy can actually be define for customers and inherited by SEs associated with these customers). If the security policy between two SEs is relaxed then resources returned by one of them and given to the other do not have to be cleaned when relocating resources between these SEs.

In order to take advantage of relaxed security, the GDFPM keeps track of the current potential set of SE "users" of every DFP. It can be determined that an SE is a potential "user" of a dynamic free pool from its definition as an aggregated resource; if the Part that represent the resource pre-provisioned is a node in the topology tree of the SE then the SE is a potential "user" of the pool.

Now, if the pairwise security policy for all SEs that are potential users of a DFP is relaxed then the DFP is marked as "returnable". This means that aggregated resources can be returned to the DFP without destruction. Otherwise it is marked as "non-returnable", that means that aggregated resources are not returned to this DFP—they are deconstructed.

The GDFPM updates the definition of each DFP as "returnable"/"non-returnable" as new SEs are provisioned, or existing SEs are de-provisioned.

The prior art meta flow for de-provisioning of an aggregated resource can be described as follows:

```
De-Provision(R)
If Basic(R)
    RM(R).delete(R)                   // a basic resource is returned
                                      to its RM
    Return
De-configure(FederatedList(R))        // this destroys previously
                                      established relationships between
                                      // federated resources
For every R' in Federated(R)
    De-Provision(R')                  // recursive call to de-provision
                                      an aggregated federated resource
```

The meta-flow according to the present invention for de-provisioning a resource is changed so that an aggregated resource is returned to its DFP, if the DFP exists, and marked as "returnable". The new meta-flow can be described as follows:

```
De-Provision(R)
DFPM = DFPM(R)
If ((DFPM <> Null) AND                // use a "returnable" DFP,
Returnable(DFPM))                     if it exists
    DFPM.delete(R)
    Return
If Basic(R)
    RM(R).delete(R)                   // we return a basic resource
                                      (w/o a returnable dynamic DFP)
                                      // to its RM for further
                                      proprietary cleaning/destruction
    Return                            // operations
De-configure(FederatedList(R))        // this destroys previously
                                      // established relationships
```

-continued

| | |
|---|---|
| | // between federated resources |
| For every R' in Federated(R) | |
|    De-Provision(R') | // recursive call to de-provision a federated resource |

New Method to Transfer Resources Between SEs

The algorithms described above can be combined and enhanced to achieve better results under various special conditions. Specifically, if the security policy between two SEs is relaxed then resources can be transferred directly between them with out de-provisioning (including cleaning) or even without returning them first to the DFP. Moreover, there may be several choices of an aggregated resource to transfer; as explained below, different choices are preferred under different conditions.

Handling a Resource Contention Condition

The idea is that if a basic resource is needed for an SE and is not available an aggregated resource can be relocated from a different SE.

Following is a description of a method to do that:

When a basic resource r, needed to construct an aggregated resource R for an SE S, is not available, find in the topology tree of R a node n representing a resource r' such that: (1) n is an ancestor of the leaf that represents r' in the topology tree; (2) there exists an SE S' that contains the resource r' and it is defined "variable"; and moving r' from S' to S will improve the overall state of the provisioning system (performance-wise or otherwise).

Security policy for the pair (S, S') is relaxed.

Note that there may be a choice as to which ancestor node to choose. Different choices will yield better results under different conditions, as explained later.

The algorithm is changed so that instead of provisioning r recursively by provisioning its federated resources, or obtaining r from a DFP, it is relocated from the SE S'. Note that every SE is represented as a virtual resource that provides interfaces to reclaim "variable" resources.

It is not necessary to come up with one meta-flow that accounts for this possibility. Rather, if a plan fails due to unavailability of a basic resource than a new plan is generated based on the algorithm described above.

Handling a Critical Time to Provision Condition:

If provisioning time is absolutely crucial and an aggregated resource r is not available in a DFP then the planner can choose to relocate the resource from a different SE instead of provisioning it. The decision also depends on whether federated resources of r are available in lower level DFPs, or need to be provisioned. The actual provisioning time of a resource r relative to a certain provisioning system state (including DFP states) is given by the following recursive expression:

$$\text{Provision\_time}(R) = \begin{cases} C \text{ (some small constant)} & \begin{array}{l}\text{If R available in a DFP or R is basic} \\ (C = \infty \text{ if R is basic but not avail})\end{array} \\ \text{Configure\_time(Federated}(R)) + \sum_{R' \in R} \text{provision\_time}(R') & \text{Otherwise} \end{cases}$$

Once the provisioning time is calculated it can be determined whether the resource should be provisioned or relocated from an existing SE. For example, if provision_time(R)>critical_time, where critical_time is given as input, then the resource is relocated instead of provisioned.

Note that by fixing C to infinity (or just to a very large number) we can unify both methods to handle the different conditions described above.

The algorithm can be further optimized: (I) to minimize the amount of disruption—if several basic resources are unavailable find a common ancestor to relocate in the topology tree; (2) to minimize the number of resources that need to be relocated find the ancestor closest in the tree (lowest) that can be relocated; and (3) to minimize the time to provision find an ancestor highest in the topology tree that can be relocated.

What is claimed is:

1. A method for provisioning of a new service environment (SE) or an aggregated resource for an existing service environment, comprising the steps of:

receiving, on a computer, a state change event for a new service environment or aggregated resource for an existing service environment;

propagating said state change event to a global dynamic free pool manager;

retrieving, on said computer, a description of said new service environment or said aggregated resource from a parts catalog and providing it to a planner component;

creating at least one dynamic free pool manager for said new service environment or said aggregated resource based on a policy of said global dynamic free pool manager, said dynamic free pool manager executing on a server comprising hardware managing an assigned dynamic free pool of aggregated resources comprising a federation of multiple related resources and a set of relationships between two or more of the related resources;

generating, on said computer, a plan for construction of said new service environment or said aggregated resource by said planner component comprising the steps:

determining a set S of resources included in said new service environment or said aggregated resource by using the description of said new service environment or said aggregated resource;

applying for each member of the set S following procedure:

invoking a resource manager of said member of the set S in order to create an instance of said basic resource, in response to determining that the member of the set S is a basic resource;

checking for the existence of a dynamic free pool manager for said member of set S, in response to determining that the member of the set S is an aggregated resource;

creating a new instance for said member of the set S, in response to determining that a dynamic free pool manager exists for the member of the set S;

continuing with said determining step until only basic resources are available, in response to determining that the dynamic free pool manager does not exist for the member of the set S; and adding newly created resources to a result set;

configuring each member of said result set; and providing access to said result set as part of said plan to said dynamic free pool manager;

creating an instance of said new service environment or said aggregated resource by said dynamic free pool manager using said plan; and generating a plan for destruction of said new service environment or said aggregated resource which comprises the steps of:
- calling said dynamic free pool manager to delete said new service environment or said aggregated resource from said provisioning environment and returning it to an assigned dynamic free pool based on determining that a dynamic free pool manager exists for said new service environment or said aggregated resource and said new service environment or said aggregated resource is returnable;
- determining whether the resource is a basic resource based on determining that said service environment or said aggregated resource is not returnable;
- calling an assigned resource manager to delete it based on determining that said resource is a basic resource; and
- continuing for each member of said set S with said first step until only basic resources are available.

2. A method according to claim 1, wherein the steps of generating the plan for destruction of said new service environment or said aggregated resource further comprises the steps of:
- de-configuring said resource and determining the set of resources included based on determining that said resource is not a basic resource.

3. A computer program product comprising a non-transitory computer readable storage medium having a computer program thereon for causing a computer to perform the method of claim 1 when said computer program is executed on a computer.

* * * * *